(12) United States Patent
Isik-Uppenkamp

(10) Patent No.: US 9,671,260 B2
(45) Date of Patent: Jun. 6, 2017

(54) MAGNETICALLY INDUCTIVE FLOW METER HAVING A FIRST ELECTRODE ARRANGEMENT FOR GALVANICALLY INDUCING VOLTAGE AND A SECOND ELECTRODE ARRANGEMENT FOR CAPACITIVELY INDUCING VOLTAGE

(71) Applicant: Siemens Aktiengesellschaft, Munich (DE)

(72) Inventor: Sonnur Isik-Uppenkamp, Flensburg (DE)

(73) Assignee: Siemens Aktiengesellschaft, Munich (DE)

( * ) Notice: Subject to any disclaimer, the term of this patent is extended or adjusted under 35 U.S.C. 154(b) by 71 days.

(21) Appl. No.: 14/646,315

(22) PCT Filed: Nov. 20, 2013

(86) PCT No.: PCT/EP2013/074238
§ 371 (c)(1),
(2) Date: May 20, 2015

(87) PCT Pub. No.: WO2014/082903
PCT Pub. Date: Jun. 5, 2014

(65) Prior Publication Data
US 2015/0300851 A1     Oct. 22, 2015

(30) Foreign Application Priority Data
Nov. 27, 2012   (DE) .................. 10 2012 221 616

(51) Int. Cl.
*G01F 1/58* (2006.01)

(52) U.S. Cl.
CPC ................................... *G01F 1/584* (2013.01)

(58) Field of Classification Search
None
See application file for complete search history.

(56) References Cited

U.S. PATENT DOCUMENTS

| | | |
|---|---|---|
| 3,329,020 A | 7/1967 | Cushing |
| 4,015,471 A | 4/1977 | Marsh |
| 4,631,969 A | 12/1986 | Schmoock |

(Continued)

FOREIGN PATENT DOCUMENTS

| | | |
|---|---|---|
| DE | 196 37 716 | 4/1998 |
| DE | 102 60 561 | 7/2004 |

(Continued)

*Primary Examiner* — Harshad R Patel
(74) *Attorney, Agent, or Firm* — Cozen O'Connor

(57) ABSTRACT

A magnetically inductive flow meter including a first electrode arrangement for galvanically contact detection of an induced voltage dependent on the flow velocity of the medium as a first measurement signal, and a second electrode arrangement for capacitive detection of an induced voltage as a second measurement signal, wherein by determining and evaluating characteristic parameters of the first and second measurement signals, diagnostic messages on the status of the medium and/or the flow meter are obtained, such as the content of gas bubbles in the fluid, electrode corrosion, electrical conductivity of the medium, damage to the electrically insulating interior lining of the measuring tube, deposits on electrodes, magnetic interference fields, electrode short-circuits and/or the fill level of the measuring tube.

6 Claims, 1 Drawing Sheet

(56) References Cited

U.S. PATENT DOCUMENTS

| | | |
|---|---|---|
| 5,289,725 A | 3/1994 | Brown |
| 5,337,607 A | 8/1994 | Brown |
| 5,544,532 A | 8/1996 | Brown |
| 8,120,370 B2 | 2/2012 | Harada et al. |
| 2006/0174715 A1 | 8/2006 | Wehrs et al. |
| 2008/0196510 A1 | 8/2008 | Nielsen |
| 2010/0011877 A1 | 1/2010 | Izumi et al. |
| 2010/0077865 A1 | 4/2010 | Rackebrandt et al. |
| 2012/0036941 A1 | 2/2012 | Drahm et al. |

FOREIGN PATENT DOCUMENTS

| | | |
|---|---|---|
| DE | 10 2008 034 565 | 2/2010 |
| DE | 102008054432 | 6/2010 |
| DE | 10 2009 002 539 | 10/2010 |
| WO | WO 93/03332 | 2/1993 |
| WO | WO 2006/050744 | 5/2006 |

MAGNETICALLY INDUCTIVE FLOW METER HAVING A FIRST ELECTRODE ARRANGEMENT FOR GALVANICALLY INDUCING VOLTAGE AND A SECOND ELECTRODE ARRANGEMENT FOR CAPACITIVELY INDUCING VOLTAGE

CROSS-REFERENCE TO RELATED APPLICATIONS

This is a U.S. national stage of application No. PCT/EP2013/074238 filed 20 Nov. 2013. Priority is claimed on German Application No. 10 2012 221 616.2 filed 27 Nov. 2012, the content of which is incorporated herein by reference in its entirety.

BACKGROUND OF THE INVENTION

1. Field of the Invention

The invention relates to a magnetically inductive flow meter having a measuring section surrounded by a wall, where a medium flows through the measuring section, and the magnetically inductive flow meter also has a magnetic field generating device, an electrode arrangement and a controller/evaluator.

2. Description of the Related Art

Magnetically inductive flow meters use Faraday's induction principle to determine the flow rate of a fluid that is flowing through the flow meter. A magnetic field is generated perpendicular to the flow direction. A voltage perpendicularly to the magnetic field and to the flow direction occurs in this magnetic field as a result of loads that are transported with the fluid, where the voltage is measureable with the aid of electrodes. The measured voltage that is determined in this manner along the measuring section is proportional to a flow rate that is determined via the flow cross section.

WO 2006/050744 A1 discloses that it is necessary for flow meters of this type to maintain geometric dimensions that are to a great extent constant in order to ensure the measuring accuracy irrespective of the actual prevailing pressure of the through-flowing fluid. This resistance to pressure is achieved via a measuring tube that is formed from steel and through which the fluid flows. In order to prevent the measuring tube from disturbing the electrical and magnetic fields that penetrate the fluid in the region of a measuring section, an insert is used in the measuring tube and the insert is essentially produced from an electrically insulating rubber or synthetic material. The insert simultaneously protects the metal wall of the measuring tube against corrosion. In order to prevent the tubular insert detaching from the inner wall of the measuring tube in the case of a pressure occurring that is essentially lower than the atmospheric pressure, whereby the flow cross section would be reduced, the electrically insulating material of the measuring tube insert is reinforced at least in one measuring section by a tubular metal mesh. The specified publication is referred to in relation to further details and advantages of the known tubular insert and also the magnetically inductive flow meter that is provided with the insert.

As a result of using electrodes to determine the induced voltage, in particular if the electrodes contact the medium in a galvanic manner, a specific conductivity of the medium is required. In addition, the medium should comprise a good homogeneity, where the measuring section by which the induced voltage is determined using the two electrodes does not include any electrically non-conductive gas bubbles, solid particles or fluid drops. Inclusions of this type lead in a disadvantageous manner to an electrically non-conductive material, i.e., a noisy signal, while detecting the induced voltage and therefore to an impairment of the measuring accuracy, in particular if the inclusions are located near to the measuring electrodes.

US 2006/0174715 A1 discloses a magnetically inductive flow meter, where the parts of the electrodes that are in galvanic contact with the medium are formed from a suitably conductive polymer material having a special shielding in order to reduce signal noise.

Furthermore, different magnetically inductive flow meters are disclosed, for example in U.S. Pat. No. 8,120,370 B2, US 2010/0011877 A1 or U.S. Pat. No. 4,631,969, where capacitive electrodes that are not in direct contact with the through-flowing medium are used to measure the voltage that is perpendicular to the magnetic field and perpendicular to the flow direction. The capacitive electrodes are not in direct contact with the flowing medium. As a result, the risk of electrode corrosion or of a galvanic noise possibly occurring at the electrode surface is avoided.

SUMMARY OF THE INVENTION

It is an object of the invention to provide a magnetically inductive flow meter that is characterized via diagnostic possibilities.

This and other objects and advantages are achieved in accordance with the invention by providing a magnetically inductive flow meter having a second electrode arrangement that determines, as a second measuring signal in a capacitive manner, a voltage that is induced via a second measuring section, where a controller/evaluator is configured so as to determine in each case a characteristic parameter of a first measuring signal and a second measuring signal and is configured to determine and output a diagnostic indication dependent upon the first parameter and/or the second parameter.

The invention relates to the knowledge that potential causes of error while determining the induced voltage via galvanically contacting electrodes and capacitive electrodes have different effects. Electrode materials that are in direct contact with an electrically conductive medium, for example, always cause a certain amount of galvanic noise. The intensity of the galvanic noise is dependent upon the respective electrode material and the characteristics of the medium flow, such as pH value, temperature, the type of ions that are possibly present or its erosion characteristics. In addition, deposits can form on the electrodes and these deposits comprise a conductivity that deviates from that of the respective medium. In the case of an improved conductivity of the deposits, this will show itself as an electrically conductive coating of a section of the inner wall or, in the other case, as a reduction of the diameter of the conducting electrode surface and, therefore, as a reduction in the sensitivity of the flow meter. Effects of this type lead to a change in the measuring signal that is specific for the use of galvanically contacting electrodes.

As a result of their larger electrode surface, capacitive electrodes are less sensitive with respect to the above described inclusions of electrically non-conductive materials in the medium. However, for the same reason, the capacitive electrodes are, on the other hand, not as well suited to detecting a media state of this type, in other words a multiphase flow.

It is possible in an advantageous and reliable manner to determine and output a diagnostic indication regarding the state of the medium or of the flow meter by comparing a characteristic parameter of the measuring signal that is obtained using galvanically contacting electrodes to a characteristic parameter of the measuring signal that is ascertained using capacitive measuring electrodes and the diagnostic indication would not be obtainable when using only a single electrode type.

A comparison of the amplitudes is particularly suitable as characteristic parameters of the measuring signals in order to identify damage to the electrically insulating interior lining of a measuring tube, to identify deposits or corrosion of the electrodes, to identify that a measuring tube is not completely filled or that there is a short circuit between the galvanically contacting electrodes. In addition, as a result of a comparison of this type, it is possible to establish whether a conductivity of the through-flowing medium is too low because capacitive electrodes generally comprise a clearly greater expanse than galvanically contacting electrodes, and consequently a sufficiently electrically conductive path occurs on the measuring section in a clearly easier manner between this type of electrodes.

The comparison of parameters that represent the respective frequency portions of the two measuring signals in predetermined frequency regions is advantageously suitable for detecting galvanic noise or a multiphase flow that is formed from materials of different electrical conductivity. Capacitive electrodes as a result of their electrical insulation with respect to the through-flowing medium and also as a result of their greater expanse are namely less sensitive with respect to the mentioned fault causes than galvanically contacting electrodes so that a reliable diagnostic indication with respect to these electrodes or rather media characteristics can be determined by comparing the respective parameters for the various electrode types.

Furthermore, the invention has the advantage that after detecting an error and determining the respective cause of error it becomes possible for the user to decide whether and which maintenance measures are necessary to rectify the error.

In the case of a particularly advantageous embodiment of the invention, the first electrode arrangement that comprises galvanically contacting electrodes, and the second electrode arrangement that is achieved using capacitive electrodes are arranged in a tubular insert that is essentially formed from an electrically insulating material, where an essentially tubular metal mesh is embedded as a mechanical reinforcement in at least one measuring section, and where the metal mesh is formed from multiple galvanic mesh parts that are insulated with respect to one another. At least two of the frame parts can then be used as capacitive measuring electrodes of the second electrode arrangement, the mesh parts comprising an opening in the center for feeding through the galvanically contacting electrodes of the first electrode arrangement. This has the advantage that the capacitive electrodes are already embedded in the electrically insulating material of the tubular insert, before the insert is placed in the measuring tube. The capacitive electrodes are assembled in other words in the same working step in which the mechanical reinforcement of the tubular insert is assembled. A special assembly step for the capacitive electrodes is no longer necessary.

In an advantageous manner, a particularly simple production of the tubular insert can be achieved if the mechanical reinforcement is formed by an essentially tubular perforated sheet that is formed from stainless steel having a uniform bending radius and the mesh parts consequently form part sections of the cylinder peripheral surface of the essentially tubular metal mesh. Here, the mesh parts are embedded in their galvanic insulation in a spacing with respect to one another in the electrically insulating material. The spacing between the mesh parts is dimensioned such that the mechanical stability of the tubular insert is ensured by the electrically insulating material that bridges the spacing.

One embodiment of the capacitive measuring electrodes is particularly effective for determining the voltage perpendicular to the magnetic field and perpendicular to the flow direction, where the electrodes are formed as two mesh parts that are arranged in a symmetrical manner with respect to one another and in relation to the tube axis. For this purpose, it is possible to embed further mesh parts in the electrically insulating material for mechanical reinforcement and electromagnetic shielding and the mesh parts are arranged in the remaining free surfaces of the cylinder peripheral surface around the capacitive measuring electrodes in the above mentioned minimum spacing with respect to the capacitive electrodes.

A tubular insert of this type can be pre-assembled in an advantageous manner entirely outside the measuring tube with the previously embedded metal mesh for mechanical reinforcement and in order to achieve the capacitive electrodes. In an advantageous manner, the production outlay of the flow meter is therefore kept small. Furthermore, the tubular insert characterizes itself by a permanent durability and geometric stability as a result of the mechanical reinforcement using the metal mesh.

In the case of a particularly advantageous embodiment of the invention, the controller/evaluator is configured to determine the measured value for the flow of the medium that is to be measured dependent upon both the first measuring signal that corresponds to the voltage that is determined using the galvanically contacting electrodes as well as the second measuring signal that is ascertained using capacitive electrodes. Capacitive electrodes are namely less sensitive with respect to the above described effects of a multiphase flow and place smaller demands upon the electrical conductivity of the medium that is to be measured so that overall a higher degree of accuracy and versatility of the flow meter is achieved.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention and also embodiments and advantages are further explained hereinunder with reference to the drawings illustrating an exemplary embodiment of the invention is, in which.

DETAILED DESCRIPTION OF THE EXEMPLARY EMBODIMENTS

Figure 1:
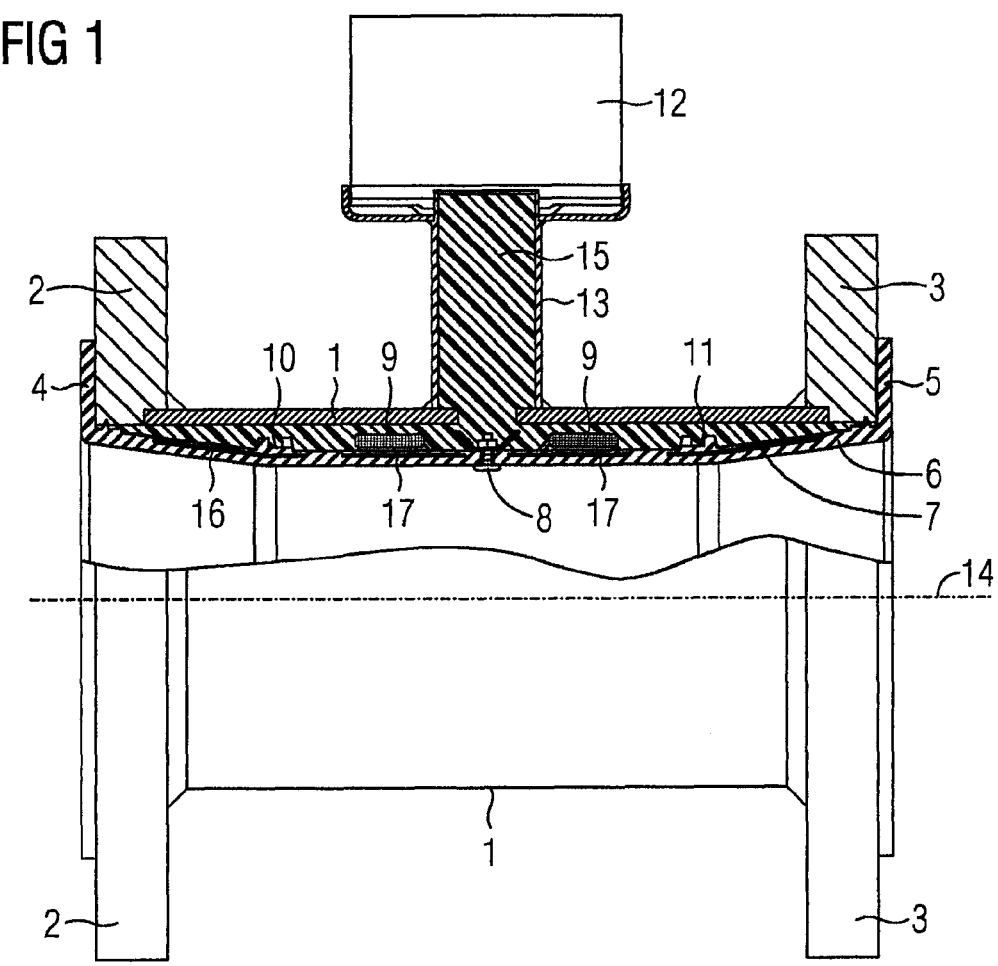
FIG. 1 illustrates a magnetically inductive flow meter in a partial longitudinal section in accordance with the invention.

A magnetically inductive flow meter comprises in accordance with FIG. 1 a measuring tube 1 that is provided with a flange 2 or a flange 3, respectively, on its two ends for installing in a pipe line. In the upper part of FIG. 1, the flow meter is illustrated in a longitudinal section for improved clarity. Each of the outer sides of the two fastening flanges 2 and 3 comprise an end section 4 or 5, respectively, that is formed in a flange-like manner of a tubular insert 6 that is made from rubber. To a large extent, the tubular insert 6 is rotationally symmetrical with respect to an axis 14 and supports two coils as magnetic field generating devices in a known manner in a measuring section in which the insert is mechanically reinforced by an essentially tubular metal mesh 7, 16, 17. Only one of the coils 9 is visible in FIG. 1. With a first electrode arrangement that comprises two electrodes that galvanically contact the medium, the electrodes lying opposite one another in relation to the measuring tube axis 14 and of which in FIG. 1 only the electrode 8 is visible, the voltage that is induced into the flowing medium is determined in a galvanically contacting manner by a first measuring section. Two capacitive electrodes, of which only the electrode 17 is visible, are formed by mesh parts that lie opposite one another with respect to the tube axis 14. The capacitive electrodes of the second electrode arrangement are component parts of the tubular metal mesh 7, 16, 17 and are spaced from the mesh parts 7, 16 by the electrically insulating material such that the mechanical stability of the tubular insert 6 is ensured. A second measuring section is formed between the capacitive electrode 17 and the capacitive electrode that lies opposite with respect to the tube axis 14 and is not visible in FIG. 1, where the second measuring section (as with the first measuring section) is surrounded by the insert 6 as a stable wall and by which the voltage that is induced in a conductive medium that is flowing through the measuring tube 1 is determined in a capacitive manner. Circumferential grooves 10 and 11 are used to secure the position of electrical lines that are required to connect the capacitive electrodes, the galvanically contacting electrodes and the coils to a controller/evaluator 12. The feed lines, which for clarity, are not illustrated in FIG. 1 are furthermore guided by a connecting tube 13. Inter alia, the two measuring signals that are determined using the two electrode arrangements are transferred via the feed lines to the controller/evaluator 12 for further processing.

Initially, a tubular insert 6 is equipped with two coils and the electrical feed lines to assemble the flow meter. One of the two end sections 4 and 5, such as the end section 4, which does not comprise a mechanical reinforcement, is folded so that the end section can be pushed through the inner cross section of the measuring tube 1. As soon as the assembled insert 6 is placed entirely into the measuring tube 1, the end section 4 springs back into its original form and the insert 6 is held in its position in the measuring tube 1 by the two end sections 4 and 5 that lie on the outer sides of the flange 2 and 3. Afterwards, the galvanically contacting electrodes, of which only the electrode 8 is visible in FIG. 1, are placed in the tubular insert 6. It is no longer necessary to assemble the capacitive electrodes since the electrodes are already integrated into the tubular insert 6. The hollow spaces that remain between the assembled insert 6 and the measuring tube 1 are filled by a thermosetting casting compound 15. As soon as this casting compound has thermoset, the insert 6 is fixed in the measuring tube 1 in a stable manner. In addition, the insert 6 is held by its end sections 4 and 5 that are squeezed together during the process of installing the flow meter in a pipe line between the flange 2 and the respective opposite lying flange of the pipe line or rather between the flange 3 and another flange of the pipe line.

Figure 2:
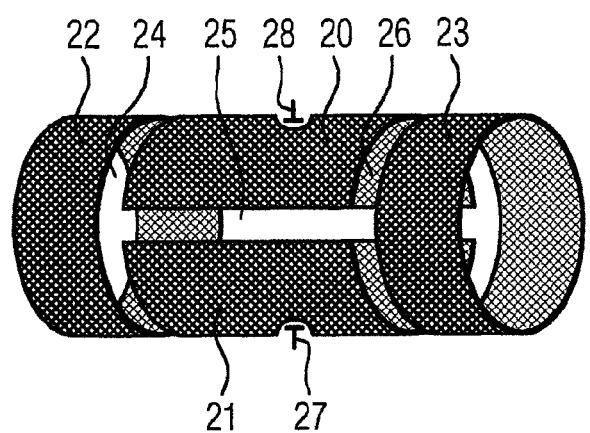
FIG. 2 illustrates mesh parts for mechanically reinforcing the electrically insulating material and for achieving capacitive electrodes having an arrangement of galvanically contacting electrodes in accordance with the invention.

FIG. 2 illustrates in a schematic diagram an example of an essentially tubular metal mesh 20, 21, 22, 23 before the mesh is embedded in electrically insulating material in a molding process to mechanically reinforce the material. In the middle region, the metal mesh 20, 21, 22, 23 is divided into two half shells that in addition to their function as a mechanical reinforcement in the measuring operation are used as capacitive electrodes 20, 21. Two mesh parts 22 or 23 respectively are arranged in the flow direction upstream and downstream and the mesh parts are formed as closed rings. Spacings 24, 25 and 26 are dimensioned between the mesh parts 20, 21, 22, 23 in such that the mechanical stability of the tubular insert is ensured in advance in these regions with the required stability by the electrically insulating material in which the essentially tubular metal mesh 20, 21, 22, 23 is embedded. It is clear that the production costs of the tubular insert that is reinforced with a multipart metal mesh in contrast to the previously used single-part tubular metal mesh are further reduced.

A first electrode arrangement having galvanically contacting electrodes 27 and 28 that are fed in an electrically insulated manner through the openings that are provided for the capacitive electrodes 21 or 20 respectively are used in the measurement operation in a galvanically contacting manner to determine a voltage that is induced as a first measurement signal and that is dependent upon the flow direction of the medium.

With the aid of a second electrode arrangement that is formed with the capacitive electrodes 20 and 21, a second measuring signal is determined dependent upon the induced voltage by essentially the same measuring section. This occurs essentially simultaneously or in alternating short intervals of time so that at the point in time when the measuring signal is determined, essentially the same voltage is induced in the medium and the two measuring signals that are determined with the two electrode arrangements correspond to one another in the case where there are no errors. The two measuring signals are further processed as input values in the controlling and evaluating device (12 in FIG. 1). With reference to the measuring signals, the controller/evaluator 12, on the one hand, determines a measured value for the flow and, on the other hand, calculates multiple characteristic parameters of the measuring signal that are comparatively evaluated to determine a diagnostic indication regarding the state of the medium or of the flow meter. The diagnostic indications relate, for example, to the presence of gas bubbles in fluids, the corrosion state of the electrodes, the electrical conductivity of the medium, possible damage to the electrically insulating inner wall of the measuring tube, deposits on the electrodes, external magnetic interference fields, an electrode short circuit and/or the fill state of the measuring tube. The measured value and diagnostic indications are further transferred via a communication interface that is not illustrated in the figures to a higher-ranking control station in a technical processing system. If an error state is indicated by the diagnostic indication, it is thus possible to initiate any required maintenance measures.

In contrast to the exemplary embodiment of an essentially tubular metal mesh that is illustrated in FIG. 2, it is clearly also possible to embody the half shell of the capacitive electrodes only by way of a smaller circumferential region of the cylinder peripheral surface. In that case, it is possible, in order to avoid too large a spacing between the capacitive electrodes that would have an undesired effect on the stability of the tubular insert, to provide the two annular mesh parts with connecting pieces that extend in the axial direction between the two electrodes. A flow meter is described as an exemplary embodiment, where the voltage that is induced in the medium flow is determined essentially via the same measuring section with the first and the second electrode arrangements. However, it is to be noted that the measuring sections in a flow meter can differ from one another as an alternative thereto with respect to position and expanse.

As a further alternative to the illustrated exemplary embodiment, the electrically insulating inner wall of the measuring tube can be produced from a ceramic material and the capacitive electrodes are arranged on the outside of the measuring tube. Galvanically contacting measuring electrodes and also reference potential electrodes can then be formed as pin electrodes and can be inserted in suitable assembly openings of the ceramic inner lining.

The invention can be used in an advantageous manner irrespective of the particular form of the insert. This can comprise by way of example a round, elliptic, right-angled or square cross section in the measuring section.

Thus, while there have shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A magnetically inductive flow meter, comprising:
   a first measuring section having a medium flowing through said first measuring section;
   a magnetic field generator;
   a first electrode arrangement for determining, as a first measuring signal in a galvanically contacting manner, a voltage which is induced via the first measuring section and which is dependent upon a flow rate of the medium flowing through the first measuring section;
   a controller/evaluator which control the magnetic field generator, determines a measured value for the flow rate and outputs the measured value for the flow rate dependent upon the first measuring signal; and
   a second electrode arrangement which determines, as a second measuring signal in a capacitive manner, a voltage which is induced via a second measuring section;
   wherein the controller/evaluator is configured so as to determine in each case a characteristic parameter of the first measuring signal and the second measuring signal and configured to determine and output a diagnostic indication dependent upon at least one of (i) the first parameter and (ii) the second parameter;
   wherein the first electrode arrangement and the second electrode arrangement are arranged in a tubular insert that is essentially formed from an electrically insulating material in which, at least in one measuring section of the first and second measuring sections, an essentially tubular metal mesh is embedded as a mechanical reinforcement;
   wherein the essentially tubular metal mesh is formed from a plurality of mesh parts that are galvanically insulated with respect to one another and of which at least two parts of the plurality of mesh parts are formed as capacitive measuring electrodes of the second electrode arrangement; and
   wherein an electrode of the first electrode arrangement is guided in each case through a center of the capacitive measuring electrodes and is galvanically insulated from the capacitive measuring electrode.

2. The magnetically inductive flow meter as claimed in claim 1, wherein the first measuring section and the second measuring section are essentially the same.

3. The magnetically inductive flow meter as claimed in claim 1, wherein the essentially tubular mesh parts are part sections of the cylinder peripheral surface of an essentially tubular metal mesh and are embedded in their galvanic insulation in a spacing with respect to one another in the electrically insulating material and said spacing is dimensioned such that mechanical stability of the tubular insert is ensured via the electrically insulating material that bridges the spacing.

4. The magnetically inductive flow meter as claimed in claim 3, wherein the two capacitive measuring electrodes are formed via two mesh parts that are arranged symmetrically with respect to one another in relation to an axis of the tube.

5. The magnetically inductive flow meter as claimed in claim 1, wherein the two capacitive measuring electrodes are formed via two mesh parts that are arranged symmetrically with respect to one another in relation to an axis of the tube.

6. The magnetically inductive flow meter as claimed in claim 1, wherein the controller/evaluator is further configured to determine the measured value for the flow dependent upon two measuring signals.

* * * * *